United States Patent [19]
Chen et al.

[11] Patent Number: 6,118,898
[45] Date of Patent: Sep. 12, 2000

[54] METHODS AND APPARATUS FOR COMPRESSING AND DECOMPRESSING MULTIPLE DATA SETS AND FOR MANAGING MEMORY STORAGE OF COMPRESSED DATA SETS

[75] Inventors: Kok S. Chen; David D. Barnes, both of Sunnyvale, Calif.

[73] Assignee: Apple Computer, Inc., Cupertino, Calif.

[21] Appl. No.: 08/827,488

[22] Filed: Apr. 10, 1997

[51] Int. Cl.[7] .............................. G06K 9/00; G06K 9/36; G06K 9/46; H04N 1/46

[52] U.S. Cl. .......................... 382/232; 382/166; 382/238; 382/239; 358/539; 358/540

[58] Field of Search ..................................... 382/166, 232, 382/238, 245, 240, 246; 358/539, 540, 426, 261.1, 261.2, 261.3, 427, 430, 432

[56] References Cited

U.S. PATENT DOCUMENTS 5,497,434  3/1996  Wilson ..................................... 382/232

Primary Examiner—Leo H. Boudreau
Assistant Examiner—Dmitry A. Novik
Attorney, Agent, or Firm—Burns, Doane, Swecker & Mathis, L.L.P.

[57] ABSTRACT

Methods and apparatus for compressing and decompressing multiple data sets (e.g., multiple color planes in a color image) in which interdependencies between the data sets, as well as spacial correlation within each data set, are used to create a plurality of compressed output data sets wherein one of the compressed output data sets includes data relating to all of the original uncompressed data sets and wherein each of the remaining output data sets includes data relating only to a particular one of the original uncompressed data sets. Advantageously, the disclosed techniques provide compression ratios approaching those of known vector compression algorithms while simultaneously providing decompression memory usage characteristics analogous to those found in planar compression systems. Thus, exemplary embodiments of the invention simultaneously provide relatively low peak and average memory requirements, corresponding to relatively low memory cost and relatively high data throughput, respectively.

52 Claims, 12 Drawing Sheets

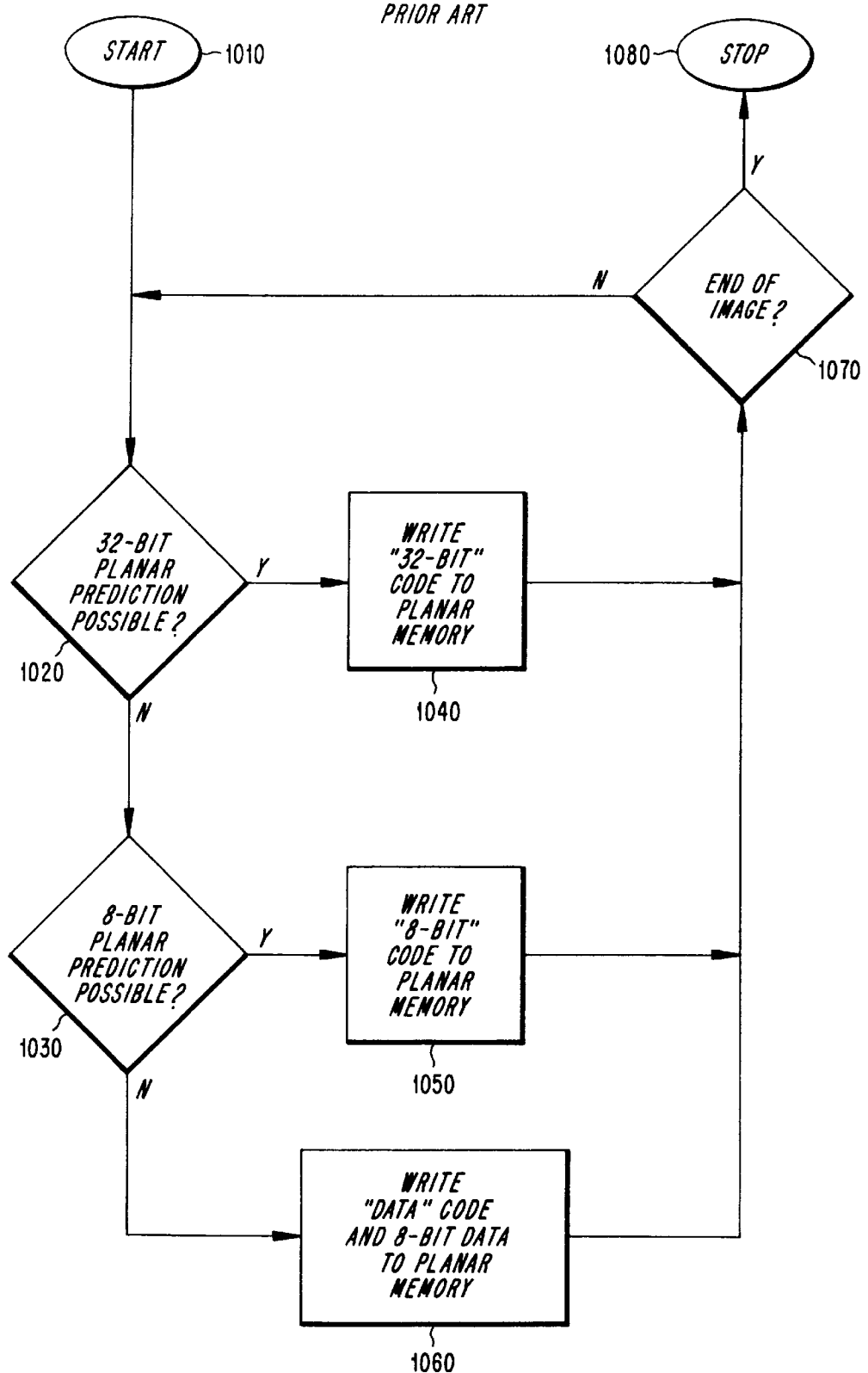

METHODS AND APPARATUS FOR COMPRESSING AND DECOMPRESSING MULTIPLE DATA SETS AND FOR MANAGING MEMORY STORAGE OF COMPRESSED DATA SETS

BACKGROUND

Today, many laser printers require that image data be available on demand for modulation of an imaging laser beam during printing of a page. In other words, once printing of a page has begun, there can be no delay or interruption of the stream of image pixel data to the laser modulator. This well known property is known in the art as page-synchronicity. Page-synchronicity is particularly common among monochromatic laser printers.

Many of the color laser printers of today retain a form of page-synchronicity as well. For example, when printing a page, most color laser printers image each of several color components, or color planes, in sequence and require that at least one entire color plane be immediately available to the laser modulator at any given time. In other words, a first color plane (e.g., cyan) is sent to the printer and imaged onto a photoconductor, and then the next color plane (e.g., magenta) is sent to the printer and imaged, and so forth. During imaging of each plane, pixel data for the entire plane must be immediately available. Though some color laser devices of today are truly page synchronous (i.e., they require that data for all planes be immediately available during printing of a page), the more recent models are plane-synchronous in nature (i.e., there can be an indefinite pause between data transmission of each plane).

Due to this page- or plane-synchronous property of laser printers, pixel data for a page or a plane must be either (a) rendered and rasterized, or otherwise created, in real time (and at high speed) during printing of the page or plane, or (b) pre-rendered and stored in an image frame memory before the first pixel is sent to the laser printer. Real-time, or race, rasterization of pixel data is an operation which is unbounded in time. In other words, because pages and planes can be arbitrarily complex, the time required to render a page or plane cannot be known a priori. Thus, real-time rasterization hardware and software must be fast enough to account for peak data rates. However, because such high-speed resources can be prohibitively expensive, real-time rasterization is often not a practical design option.

Alternatively, if an entire page or plane is pre-rendered into memory, then assuming the memory subsystem is fast enough that stored data can be read back at the pixel rate required by the laser modulator, the rasterization hardware and software need not operate at real-time rates. As a result, many systems of today are constructed to utilize pre-rendering techniques. However, the memory required for full-frame buffer rendering (i.e., storage of an entire page or plane) can also be quite expensive given the high resolution of today's laser printers. For example, at 600 dpi, letter-sized bi-level black and white printers require 4 MB of storage per page. Additionally, 8-bit-per-pixel Cyan-Magenta-Yellow-Black (CMYK) color printers require 128 MB of storage per 600 dpi letter-sized page.

Thus, systems are now being built in which data compression techniques are used to minimize the memory needed to store pre-rendered images. In other words, a rendered page or plane is compressed as it is being generated so that the memory required to store the resulting image is reduced. Since known data compression methods provide bounded decompression times, decompression of the data can be done in real-time during printing to satisfy the page or plane synchronicity requirements of the printer.

However, known methods of compression require that a system designer compromise between maximum data throughput and minimum memory cost. This is due to the fact that certain known compression techniques result in relatively small peak memory requirements and relatively large average memory requirements during printing (corresponding to relatively low memory cost and relatively low data throughput, respectively), while other known compression techniques result in relatively large peak memory requirements and relatively small average memory requirements during printing (corresponding to relatively high memory cost and relatively high data throughput, respectively).

However, because higher system throughput and lower system cost are always desirable, it would be advantageous if a system designer could minimize both peak and average memory requirements simultaneously. Thus, there is a need for improved methods and apparatus for compressing data and for managing memory storage of compressed data.

SUMMARY OF THE INVENTION

The present invention fulfills the above described and other needs by providing a novel method of compressing multiple data sets (e.g., multiple color planes) in which interdependencies between the data sets, as well as spacial correlation within each data set, are used to create a plurality of compressed output data sets. According to the invention, one of the compressed output data sets includes data relating to a multiplicity of the original uncompressed data sets, while the remaining output data sets include data relating only to a particular one of the original data sets.

Advantageously, the data compression techniques of the present invention provide compression ratios approaching those of known vector compression techniques (i.e., known techniques based solely on interdependencies between data sets). Thus, peak memory requirements for a system employing the compression techniques of the present invention are relatively low as desired. Additionally, because memory used to save the output data sets relating to only one original data set can be released as soon as the original data set has been decompressed, the average memory requirements of a system employing the compression techniques of the present invention are relatively low as well. As a result, such a system can provide high data throughput as desired.

In an exemplary embodiment, a plurality of uncompressed data sets are received as input, and respective portions of the uncompressed data sets are compressed together as a group, using a vector compression technique, to form vector compressed data relating to all of the uncompressed data sets. Additionally, portions of the uncompressed data sets which cannot be compressed in vector fashion are compressed in a planar fashion, using a planar compression technique, to form planar compressed data relating to the individual uncompressed data sets. In the exemplary embodiment, the vector compressed data is stored in a vector data memory storage area, and the planar compressed data are stored in a plurality of planar data memory storage areas, wherein each one of the planar storage areas includes compressed data relating to only one of the uncompressed data sets. During decompression, the planar data memory storage areas are released as the original data sets are reconstructed in order to provide reduced average memory requirements and increased throughput. Additionally, because the peak memory requirements of the exemplary system are approximately the same size as those of known vector compression systems, the exemplary system can be implemented relatively inexpensively.

The above described and additional features of the present invention are explained in greater detail hereinafter with reference to the illustrative examples which are shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

FIG. 10 depicts steps in a prior art planar prediction-encoding algorithm.

DETAILED DESCRIPTION

Figure 1:
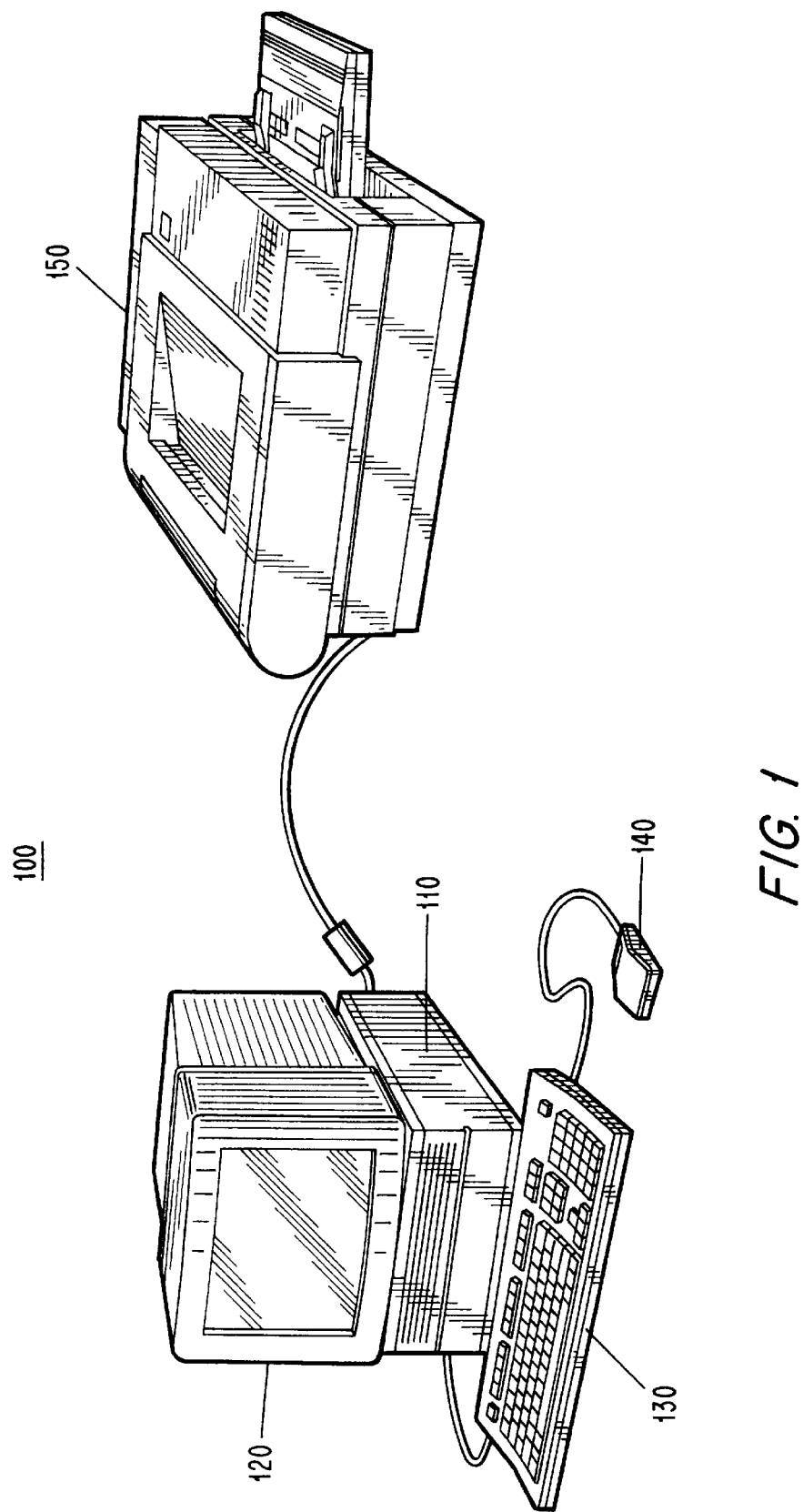
FIG. 1 depicts an exemplary computer system in which the teachings of the present invention may be used.

FIG. 1 depicts an exemplary computer system 100 in which the data compression and memory management methods and apparatus of the present invention may be used. As shown, the exemplary computer system 100 includes a computer 110, a display monitor 120, a keyboard 130, a cursor control device 140 and a laser printer 150. In practice, the exemplary computer system 100 may be implemented using any suitable computer, such as a Macintosh™ computer, a product of Apple Computer, Incorporated, located in Cupertino, Calif. Additionally, the laser printer 150 can be any laser printer suited for use with a pre-rendering framework as described above. An example of such a laser printer is the Apple Color LaserWriter™ 12/600, also a product of Apple Computer, Incorporated.

As noted above, exemplary embodiments of the present invention provide, among other things, improved methods and apparatus for conducting image data compression and image memory management in a system such as that depicted in FIG. 1. However, based on the discussion that follows, those skilled in the art will immediately recognize that the techniques of the present invention are equally applicable to any situation in which related data groups are to be compressed. Thus, those skilled in the art will appreciate that the following detailed description is provided with reference to the system of FIG. 1 in order to aid understanding, and that the teachings of the present invention are readily applicable elsewhere.

Figure 2A:
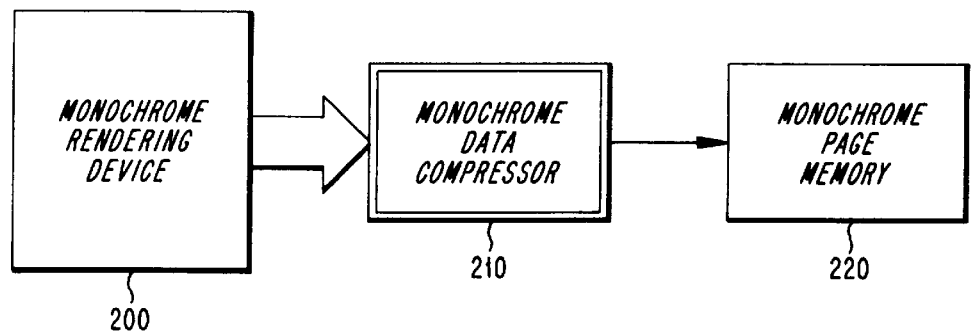
FIG. 2(A) depicts a prior art monochrome-data compression system.
Figure 2B:
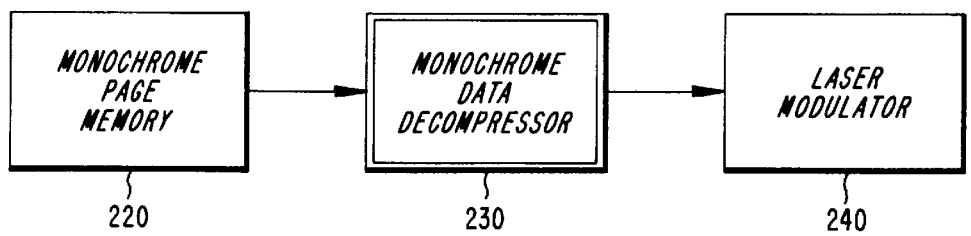
FIG. 2(B) depicts a prior art monochrome-data decompression system.

In a monochrome (e.g., black and white) laser printing system, image data compression and decompression is relatively straightforward. By way of example, FIGS. 2(A) and 2(B) show a typical monochrome-data imaging system. Specifically, FIG. 2(A) depicts a data compression portion of the monochrome imaging system, and FIG. 2(B) depicts a data decompression portion of the system.

As shown in FIG. 2(A), an exemplary monochrome data compression system 205 includes a monochrome rendering device 200, a monochrome data compressor 210 and a monochrome page memory 220. An output of the monochrome rendering device 200 is coupled to an input of the monochrome data compressor 210, and an output of the monochrome data compressor 210 is in turn coupled to an input of the monochrome page memory 220.

As shown in FIG. 2(B), an exemplary monochrome data decompression system 215 includes the monochrome page memory 220 of FIG. 2(A), a monochrome data decompressor 230 and a laser modulator 240. An output of the monochrome page memory 220 is coupled to an input of the monochrome data decompressor 230, and an output of the monochrome data decompressor is in turn coupled to an input of the laser modulator 240.

Those skilled in the art will appreciate that the components of FIGS. 2(A) and 2(B) can be physically situated relative to one another, within an overall monochrome imaging system, as is appropriate for a particular application. As an example, the monochrome rendering device 200 may be situated within a computer 110 such as that depicted in FIG. 1, while the monochrome data compressor 210, the monochrome page memory 220, the monochrome data decompressor 230 and the monochrome laser modulator 240 may be situated within a laser printer 150 such as that depicted in FIG. 1.

In operation, the monochrome rendering device 200 generates (e.g., at the request of a user of the computer system 100 of FIG. 1) an uncompressed pixel data set describing a particular monochromatic image (e.g., an image produced by an application running on the computer 110 of FIG. 1) which is to be printed. The uncompressed pixel data is then input to the monochrome data compressor 210 where it is compressed using well known compression techniques. Such techniques typically rely on spacial correlation between pixels within the image as is also well known in the art. As the pixel data is compressed, the resulting compressed data is stored in the monochrome page memory 220.

Once an entire page of compressed data is stored in the monochrome page memory 220, the monochrome data decompressor 230 begins to retrieve the compressed data from the monochrome page memory 220. Recall that the page-synchronicity requirements of the laser modulator 240 typically necessitate that an entire compressed page be stored in the monochrome page memory 220 before the data decompression and laser imaging begin. As is well known in the art, the monochrome data decompressor 230 reconstructs the original pixel data generated by the monochrome renderer 200 and provides it to the laser modulator 240 for imaging. Of course, the reconstructed pixel data is converted as necessary to provide appropriate control signals for the laser modulator 240.

For purposes of understanding the present invention, color imaging can be viewed as successive multiple passes of the monochrome printing operation described above with respect to FIGS. 2(A) and 2(B). For example, it is well known in the art that three inks (e.g., cyan, magenta and yellow) are sufficient to render a credible color image. Thus, a color image can be described as a combination of three coordinated monochromatic images, and the color image can be generated by performing three successive printing operations to superimpose each of the three monochromatic images on a single printing surface.

Alternatively, four colors (e.g., cyan, magenta, yellow and black) can be used to further enhance the resulting color images, especially with respect to neutral colors including grays and blacks. Today, all but the most inexpensive printers make use of four or more printing inks, and most four-color printers use cyan, magenta, yellow and black inks. Accordingly, four-color printers are often referred to in the art as CMYK printers. As described above, most of today's color laser printers are planar devices. In other words, the laser printer prints one color plane (i.e., one ink) at a time and does not start imaging a color plane until any preceding color plane has been completely imaged.

Generally speaking, the compression methods used to achieve plane-synchronicity in today's color laser printers can be classified into two basic categories: (a) planar compression methods and (b) vector compression methods. Planar compression methods are those which treat color pages as if each color component, or plane, is entirely independent of the other color components. For example, in a CMYK printer, a printer using planar compression compresses the cyan plane without considering the data in the magenta, yellow or black planes. This type of planar compression is usually achieved through spacial correlation of pixels as is well known in the art. By way of contrast, vector compression methods consider inter-dependencies between color planes. Both spacial correlation and inter-plane correlation is used during the compression process. Because vector compression includes inter-plane dependencies, vector compression methods typically yield better compression ratios than do planar compression methods. The relative compression ratios of planar and vector compression methods are described in more detail below.

Figure 3A:
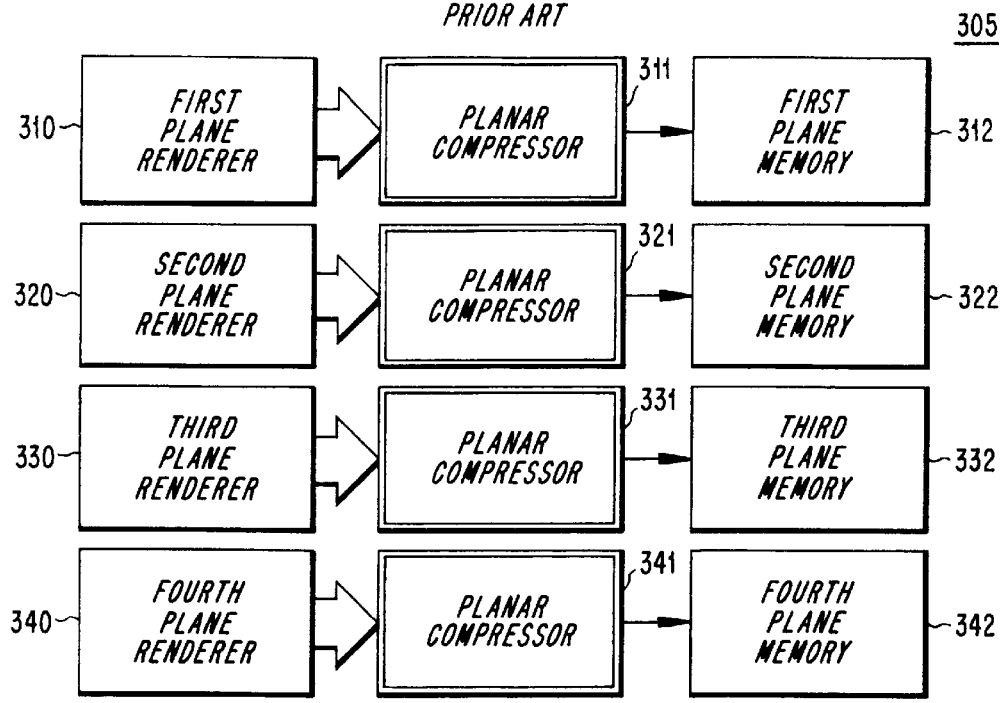
FIG. 3(A) depicts a prior art planar color-data compression system.
Figure 3B:
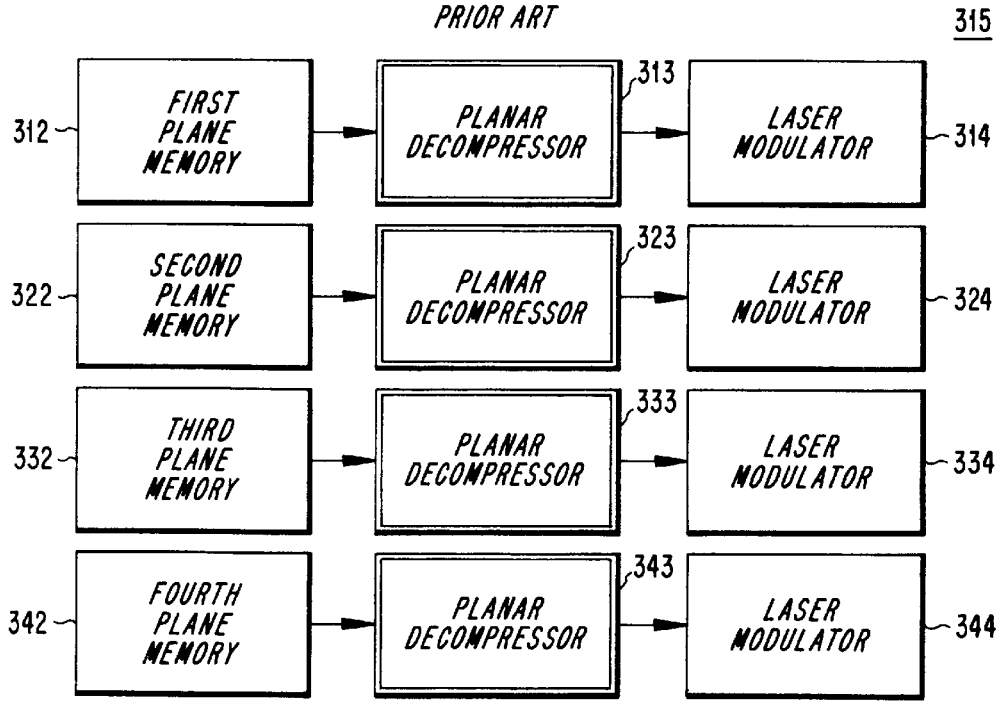
FIG. 3(B) depicts a prior art planar color-data decompression system.

FIGS. 3(A) and 3(B) depict prior art planar compression and decompression systems, respectively. As shown in FIG. 3(A), an exemplary planar compression system 305 includes a first plane renderer 310 having an output coupled to an input of a first planar compressor 311 which in turn has an output coupled to an input of a first plane memory 312. The planar compression system 305 also includes a second plane renderer 320 having an output coupled to a second planar compressor 321 which in turn has an output coupled to an input of a second plane memory 322. Additionally, a third plane renderer 330 has an output coupled to an input of a third planar compressor 331 which in turn has an output connected to an input of a third plane memory 332. Finally, a fourth plane renderer 340 has an output coupled to an input of a fourth planar compressor 341 which in turn has an output connected to an input of a fourth plane memory 342.

As shown in FIG. 3(B) an exemplary planar decompression system 315 includes the first, second, third and fourth plane memories 312, 322, 332, 342 of FIG. 3(A). In FIG. 3(B), an output of the first plane memory 312 is coupled to an input of a first planar decompressor 313, and an output of the first planar decompressor 313 is coupled to an input of a first laser modulator 314. Additionally, an output of the second plane memory 322 is coupled to an input of a second planar decompressor 323, and an output of the second planar decompressor 323 is coupled to an input of a second laser modulator 324. An output of the third plane memory 332 is coupled to an input of a third planar decompressor 323 which in turn has an output coupled to an input of a third laser modulator 324. Finally, an output of the fourth plane memory 342 is coupled to an input of a fourth planar decompressor 343, and an output of the fourth planar decompressor 343 is coupled to an input of a fourth laser modulator 324.

As with FIGS. 2(A) and 2(B), those skilled in the art will appreciate that the components of FIGS. 3(A) and 3(B) can be physically situated relative to one another, within an overall planar color imaging system, as is appropriate for a particular application. As an example, the plane rendering devices 310, 320, 330, 340 may be situated within a computer 110 such as that depicted in FIG. 1, while the planar compressors 311, 321, 331, 341, the plane memories 312, 322, 332, 342, the planar decompressors 313, 323, 333, 343 and the laser modulators 314, 324, 334, 344 may be situated within a laser printer 150 such as that depicted in FIG. 1.

Those skilled in the art will also appreciate that FIGS. 3(A) and 3(B) are conceptual in nature and that functions performed by parallel components in the figures may actually be performed in practice by a single component. For example, the plane renderers 310, 320, 330, 340 are typically implemented as a single renderer which produces multiple color planes of a color image in tandem. Similarly, the planar compressors 311, 321, 331, 341 are typically implemented as a single planar compressor operating on individual color planes in sequential fashion. The same may be said for the planar decompressors 313, 323, 333, 343 and the laser modulators 314, 324, 334, 344. Furthermore, the plane memories 312, 322, 332, 342 may actually be partitions, or areas, within a single memory structure. The parallel components of FIGS. 3(A) and 3(B) are included to facilitate the following description of the planar compression process.

In operation, the first rendering device 310 generates (e.g., at the request of a user of the computer system 100 of FIG. 1) an uncompressed pixel data set describing a first color plane (e.g., cyan) in an image which is to be printed. The uncompressed pixel data is then input to the first planar compressor 311 where it is compressed using well known planar compression techniques. Such techniques typically rely on spacial correlation between pixels within the plane as is also well known in the art. As the planar pixel data is compressed, the resulting planar compressed data is stored in the first plane memory 312.

Thereafter, the second rendering device 320 generates an uncompressed pixel data set describing a second color plane (e.g., magenta) in the image which is to be printed. The uncompressed pixel data is then compressed by the second planar compressor 321, and the resulting planar compressed data is stored in the second plane memory 322. Similarly, third and fourth color planes (e.g., yellow and black) of the image to be printed are generated, compressed and stored using the third and fourth plane renderers 330, 340, the third and fourth planar compressors 331, 341 and the third and fourth plane memories 332, 342, respectively.

Once an entire page (i.e., four color planes) of compressed data is stored in the plane memories 312, 322, 332, 342, the first planar decompressor 313 begins to retrieve the first plane of compressed data from the first plane memory 312. As is well known in the art, the first planar decompressor 313 reconstructs the original pixel data generated by the first plane renderer 310 and provides it on demand to the first laser modulator 314 for imaging. As above, the reconstructed pixel data is converted as necessary to provide appropriate control signals for the laser modulator 314. Once the first color plane has been imaged, the second planar decompressor 323 reconstructs the original pixel data generated by the second plane renderer 320 and provides it on demand to the second laser modulator 324. After the second color plane has been imaged, the third and fourth color planes are imaged in succession in a similar fashion.

Note that at the beginning of the decompression process, all four plane memories 312, 322, 332, 342 contain data which is necessary for imaging (i.e., each memory contains compressed pixel data for a particular color plane). However, once the first color plane has been imaged, the data in the first plane memory 312 is no longer needed. Accordingly, the first plane memory 312 can be released for other purposes (e.g., to accept compressed pixel data for a first color plane of a new image). Similarly, the second, third and fourth plane memories 322, 332, 342 can be released at the completion of imaging of the second, third and fourth color planes, respectively. By releasing memory in this fashion, the throughput of the printer can be increased over what it would otherwise be if the respective planar data had to be retained in all four memories until the entire color image was printed.

Figure 4A:
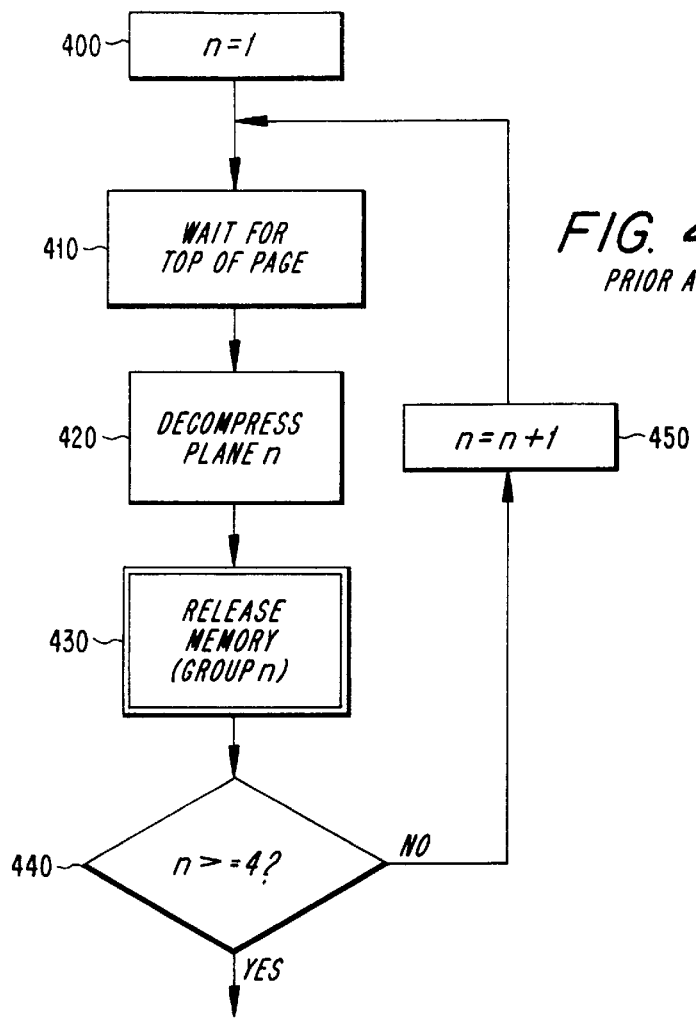
FIG. 4(A) depicts steps in a prior art memory management scheme used in conjunction with the planar compression and decompression systems of FIGS. 3(A) and 3(B).

FIG. 4(A) is a flow chart depicting the process of releasing memory in a planar imaging system such as that shown in FIGS. 3(A) and 3(B). As shown in FIG. 4(A), a plane counter n is set at step 400 to equal 1 at the beginning of an image (e.g., at the beginning of a new page). At step 410, processing is stopped until an indication is received that the laser modulator is ready to receive data (e.g., that the last plane of a previous page has been imaged). Once such an indication is received, the first color plane of the current image is retrieved from the first planar memory, decompressed and supplied on demand to the laser modulator at step 420.

Thereafter, the first plane memory is released at step 430 so that it may receive data for the next image or page, and then a determination is made at step 440 as to whether the last color plane in the current page has been imaged (i.e., n is compared to the number of color planes known to be in an image). If not, steps 410, 420 and 430 are repeated until all of the color planes are imaged and all of the plane memories are released. Once the last plane memory is released, then further processing continues (e.g., at step 400 to process another image).

Figure 4B:
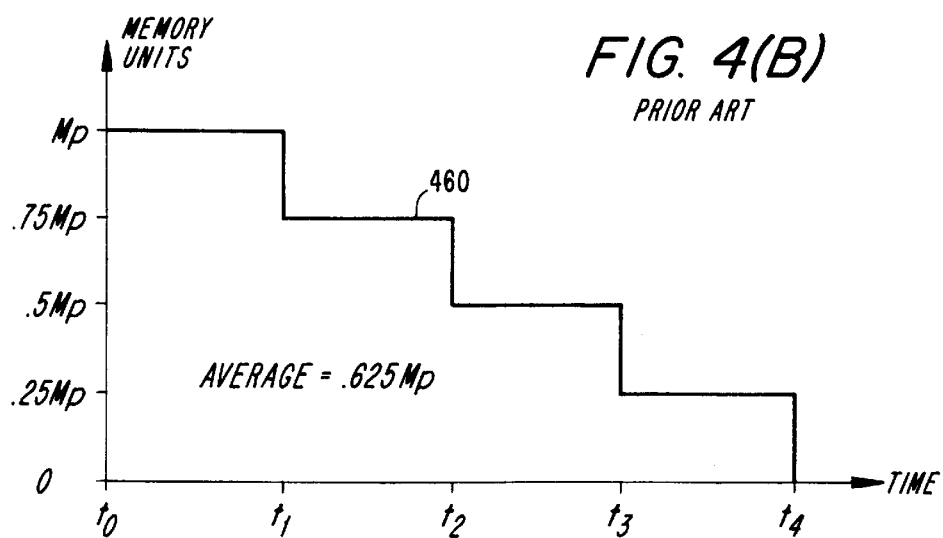
FIG. 4(B) depicts memory usage characteristics of the prior art memory management scheme of FIG. 4(A).

FIG. 4(B) is a graphic depiction of the memory release characteristics of the memory management scheme of FIG. 4(A). As shown, at a time to (e.g., corresponding to the start of a page), memory usage is at a maximum. In other words, all of the plane memories 312, 322, 332, 342 are occupied with compressed data needed to process the current image. In the figure, the total memory occupied by all four plane memories at time to is shown as a standardized memory unit having a value of $M_P$. As the image is processed and the plane memories are successively released, the amount of occupied memory decreases in step-wise fashion.

Thus, as shown in FIG. 4(B), the occupied memory drops at time $t_1$ (corresponding to the completion of imaging of the first color plane) to a value of $0.75M_P$. Thereafter, the occupied memory drops to $0.5M_P$, $0.25M_P$ and 0.0 at times $t_2$, $t_3$ and $t_4$, respectively (wherein times $t_2$, $t_3$ and $t_4$ correspond to the completion of imaging of the second, third and fourth color planes, respectively). Note that it is assumed that the same amount of memory is required to store each of the respective color planes, so that one fourth of the overall memory is released at the completion of each plane.

In FIG. 4(B), it can be seen that the average memory requirement for a planar imaging system such as that shown in FIGS. 3(A) and 3(B) is $0.625M_P$ memory units (i.e., the average of $M_P$, $0.75M_P$, $0.5M^P$ and $0.25M^P$). As described in more detail below, the stair-stepped memory release profile of FIG. 4(B) is a desirable feature in an imaging system. Specifically, the practice of releasing memory as it is no longer needed enables system throughput to be maximized. However, because known planar compression techniques provide relatively poor overall compression ratios, the peak memory requirement for planar imaging systems can be prohibitive. In other words, the memory required to hold all four compressed color planes (e.g., from $t_0$ to $t_1$ in FIG. 4(B)) is comparatively large. Even though the average memory requirement is only 0.625 times the peak value $M_P$, the system must be constructed to handle the peak requirement. As noted above, this can be a significant disadvantage due to the high cost of memory.

In the example of FIG. 4(B), the sections of memory are shown as being released upon the completion of imaging of each color plane for illustrative purposes. In practice, the memory can be released in smaller increments on a more continual basis. For example, in some imaging systems a page of data is processed and compressed in horizontal strips, known as bands. In these types of systems, the memory allocated to a band can be released as soon as that band's data has been decompressed and imaged, rather than wait until the entire color plane is imaged. As a result, more memory can be freed at a faster rate.

Figure 5A:
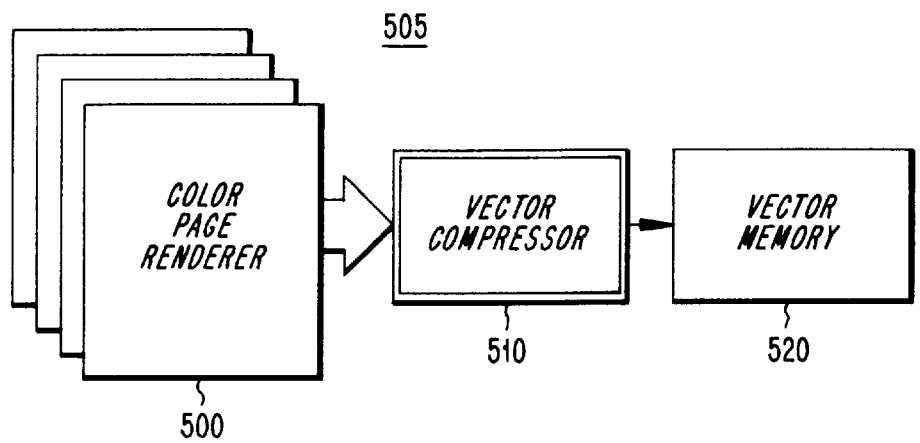
FIG. 5(A) depicts a prior art vector color-data compression system.

Turning now to the vector compression systems noted above, FIGS. 5(A) and 5(B) depict an exemplary vector imaging system. As shown in FIG. 5(A), an exemplary vector compression system 505 includes a color page rendering device 500, a vector compressor 510 and a vector memory 520. An output of the color page rendering device 500 is coupled to an input of the vector compressor 510, and an output of the vector compressor 510 is coupled to an input of the vector memory 520.

Figure 5B:
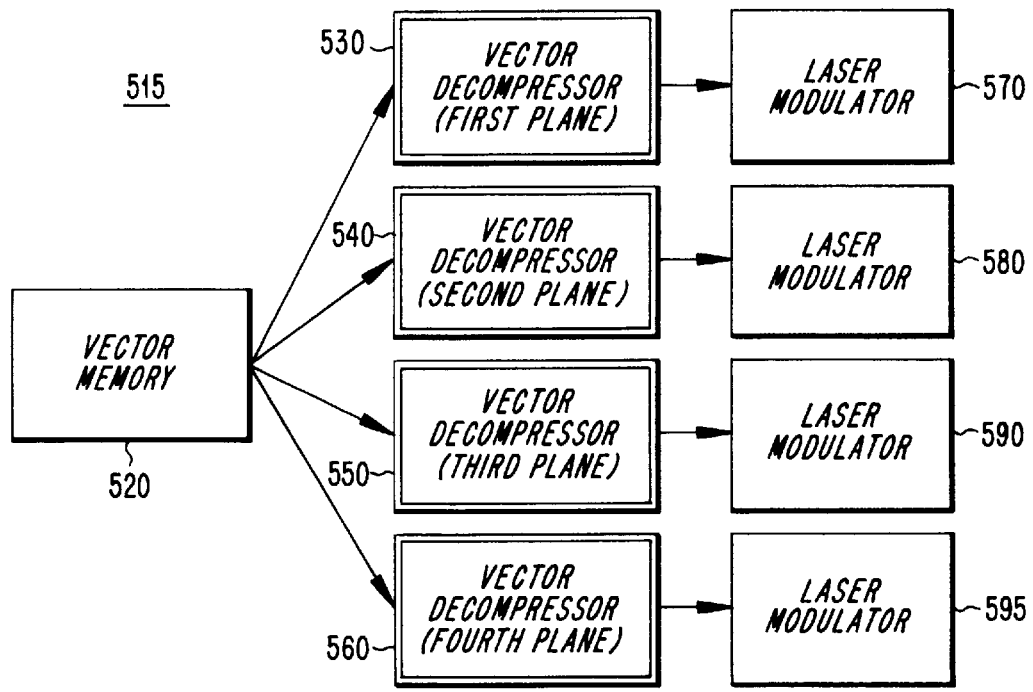
FIG. 5(B) depicts a prior art vector color-data decompression system.

As shown in FIG. 5(B) an exemplary vector decompression system 515 includes the vector memory 520 of FIG. 5(A), four vector decompressors 530, 540, 550, 560 and four laser modulators 570, 580, 590, 595. An output of the vector memory 520 is coupled to an input of each of the four vector decompressors 530, 540, 550, 560, and an output of each of the four vector decompressors 530, 540, 550, 560 is coupled to an input of a respective one of the four laser modulators 570, 580, 590, 595.

As with FIGS. 3(A) and 3(B), those skilled in the art will appreciate that the components of FIGS. 5(A) and 5(B) can be physically situated relative to one another, within an overall vector color imaging system, as is appropriate for a particular application. As an example, the color page renderer 500 may be situated within a computer 110 such as that depicted in FIG. 1, while the vector compressor 510, the vector memory 520, the vector decompressors 530, 540, 550, 560 and the laser modulators 570, 580, 590, 595 may be situated within a laser printer 150 such as that depicted in FIG. 1.

Those skilled in the art will also appreciate that FIGS. 5(A) and 5(B) are conceptual in nature and that functions performed by parallel components in FIG. 5(B) may actually be performed in practice by a single component. For example, the vector decompressors 530, 540, 550, 560 are typically implemented as a single vector decompressor operating to reconstruct individual color planes in sequential fashion (as described below). The same may be said for the laser modulators 570, 580, 590, 595. The parallel components of FIG. 5(B) are included to facilitate the following description of the vector compression process.

In operation, the page rendering device 500 generates (e.g., at the request of a user of the computer system 100 of FIG. 1) uncompressed pixel data sets describing color planes (e.g., cyan, magenta, yellow and black) in an image which is to be printed. The uncompressed pixel data sets are then input to the vector compressor 510 where they are compressed using well known vector compression techniques. Such techniques typically rely on inter-dependencies between the color planes, as well as spacial correlation within each plane, as is also well known in the art. As the pixel data sets are compressed, the resulting vector compressed data is stored in the vector memory 520.

Once an entire page of vector compressed data is stored in the vector memory 520, the first vector decompressor 530 reconstructs the original pixel data for the first color plane, using the vector compressed data, and provides it on demand to the first laser modulator 570 for imaging. As above, the reconstructed pixel data is converted as necessary to provide appropriate control signals for the laser modulator 570. Once the first color plane has been imaged, the second vector decompressor 540 reconstructs the original pixel data for the second color plane, again using the vector compressed data, and provides it on demand to the second laser modulator 580. After the second color plane has been imaged, the third and fourth color planes are imaged in succession in a similar fashion.

Note that the vector memory 520 contains data which is necessary for imaging throughout the decompression process (i.e., the vector memory 520 contains compressed pixel data necessary to reconstruct every color plane in the image). Thus, the contents of the vector memory 520 must be retained until the entire page has been imaged, and the vector memory can be released only when the last color plane has been completely decompressed.

Figure 6A:
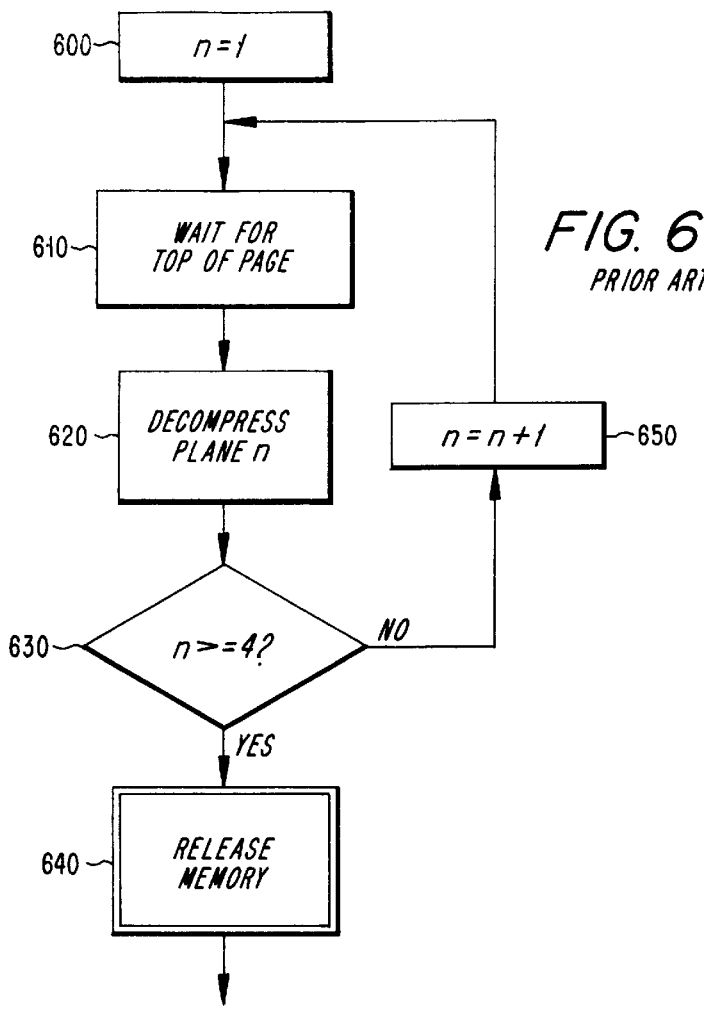
FIG. 6(A) depicts steps in a prior art memory management scheme used in conjunction with the vector compression and decompression systems of FIGS. 5(A) and 5(B).

FIG. 6(A) is a flow chart depicting the memory release process in a vector imaging system such as that shown in FIGS. 5(A) and 5(B). As shown in FIG. 6(A), a plane counter n is set at step 600 to equal 1 at the beginning of an image (e.g., at the beginning of a new page). At step 610, processing is stopped until an indication is received that the laser modulator is ready to receive data (e.g., that the last plane of a previous page has been imaged). Once such an indication is received, the vector compressed data is retrieved from the vector memory and decompressed to reconstruct the first color plane at step 620. Thereafter, a determination is made at step 630 as to whether the last color plane in the current page has been imaged (i.e., n is compared to the number of color planes known to be in an image). If not, steps 610 and 620 are repeated until all of the color planes are imaged. Once the last color plane has been processed, the vector memory is released and further processing continues (e.g., at step 600 to process another image).

Figure 6B:
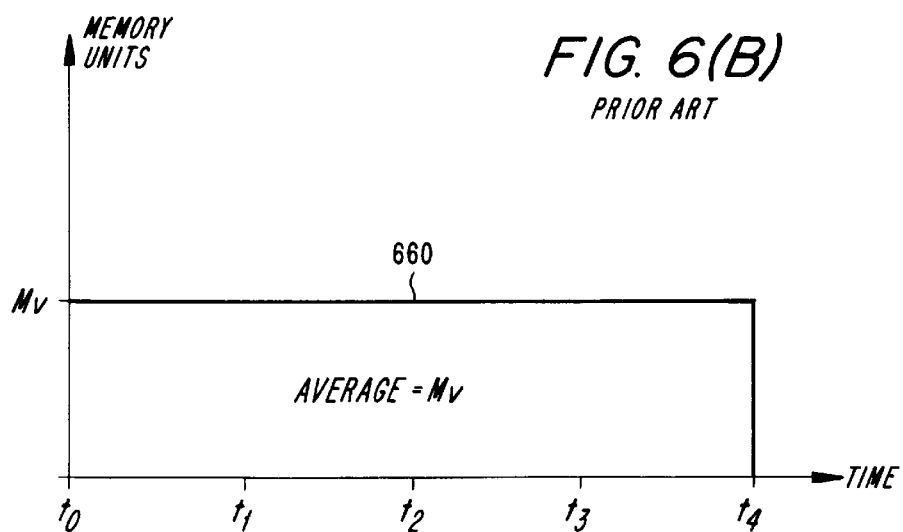
FIG. 6(B) depicts memory usage characteristics of the prior art memory management scheme of FIG. 6(A).

FIG. 6(B) is a graphic depiction of the memory release characteristics of the memory management scheme of FIG. 6(A). As shown, the contents of the vector memory (shown as a standardized memory unit having a value of $M_V$) are retained from the time processing starts on the first color plane (at $t_0$) until the time processing is completed on the last color plane (at $t_4$). Thus, the vector imaging system does not provide the beneficial step-wise release characteristics provided by the planar imaging system of FIGS. 3(A) and 3(B).

As noted above, the peak memory usage $M_V$ of the vector system of FIGS. 5(A) and 5(B) is typically significantly smaller than the peak memory usage $M_P$ of the planar system of FIGS. 3(A) and 3(B). For example, known CMYK vector compression methods which make use of luminance-chrominance relationships can provide compression ratios which are approximately twice those provided by comparable planar compression methods. Therefore, the peak memory usage $M_V$ for such vector schemes can be as little as half the peak memory usage $M_P$ of the comparable planar compression schemes. However, because the total peak memory usage $M_V$ must be reserved throughout the vector printing process, vector compression methods do not provide the beneficial average memory profiles (i.e., step-wise release of portions of memory) provided by planar compression methods.

Advantageously, the present invention teaches hybrid vector-planar compression techniques which provide peak memory profiles that approach those of vector compression systems, but which also provide a superior average memory profile analogous to that provided by planar imaging systems. Generally, the present invention teaches storage of multiple sets of compressed color plane data wherein one group stores data relating to all of the color planes of a color image and additional groups store data relating only to a particular one of the color planes in the image.

As described below, any data that is ultimately used only during recreation of a first color plane (e.g., the cyan plane) are placed in a first planar memory area during the compression process. Additionally, any data that is ultimately used only during recreation of a second color plane (e.g., the magenta plane) are placed in a second planar memory area. Similarly, any data that is ultimately used only during recreation of a third color plane (e.g., the yellow plane) are placed in a third planar memory area, and any data that is ultimately used only during recreation of a fourth color plane (e.g., the black plane) are placed in a fourth planar memory area. Lastly, any data that is used during recreation of multiple color planes is stored in a vector memory area. Since each item of data that is stored in the vector memory area reduces the amount of data that must be stored in multiple individual planar areas, the overall memory requirements are decreased. Furthermore, because only the vector memory area need be retained throughout the decompression process, the present invention provides a system having a relatively low peak memory requirement and a relatively low average memory requirement.

Figure 7A:
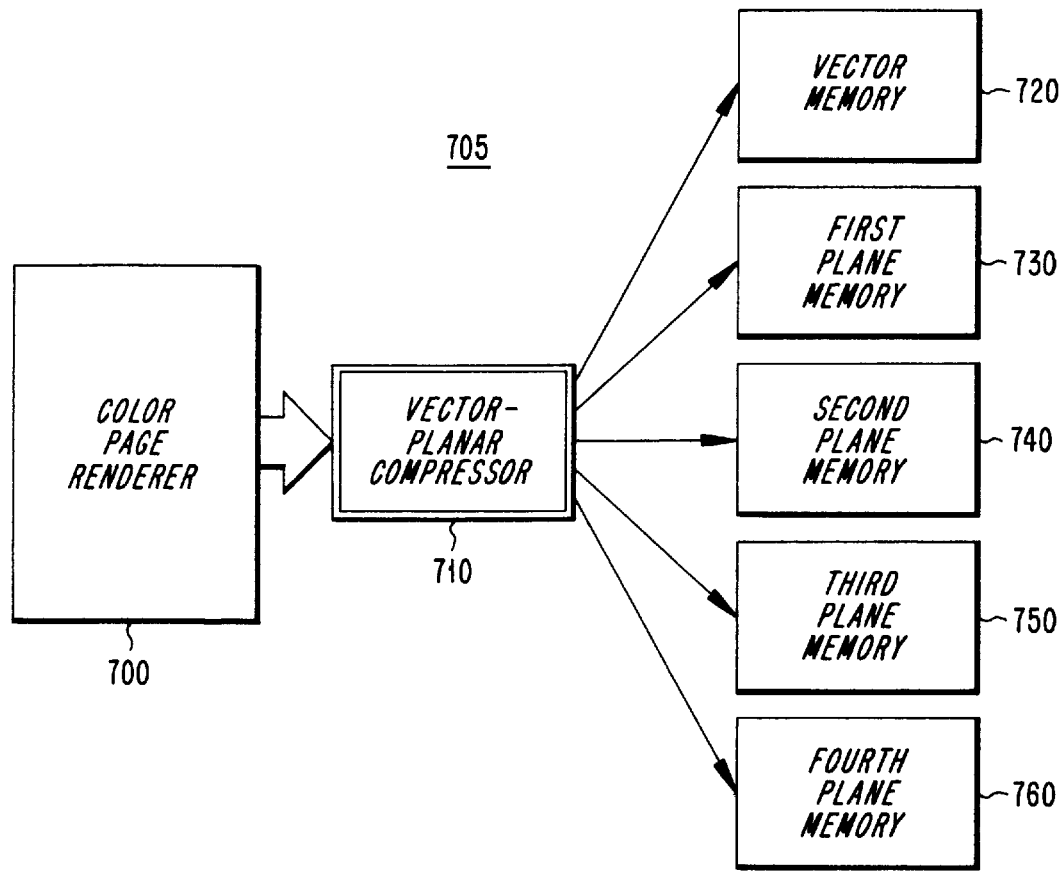
FIG. 7(A) depicts an exemplary vector-planar color-data compression system constructed in accordance with the teachings of the present invention.
Figure 7B:
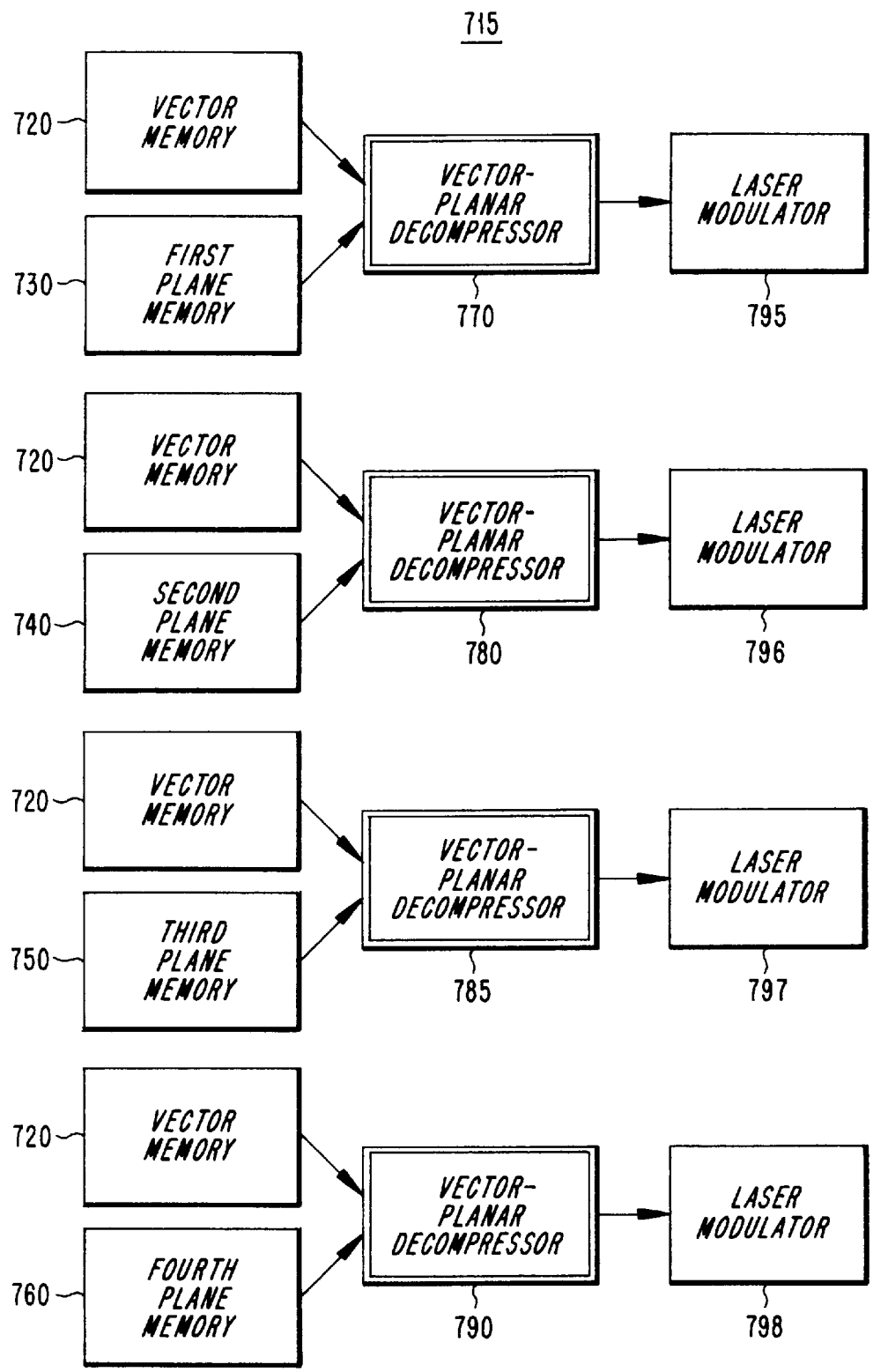
FIG. 7(B) depicts an exemplary vector-planar color-data decompression system constructed in accordance with the teachings of the present invention.

FIGS. 7(A) and 7(B) depict exemplary vector-planar compression and decompression systems, respectively. As shown in FIG. 7(A), an exemplary planar compression system 705 includes a color page renderer 700, a vector-planar compressor 710, a vector memory 720, and first, second, third and fourth plane memories 730, 740, 750, 760. An output of the color renderer 700 is coupled to an input of the vector-planar compressor 710 and an output of the vector-planar compressor 710 is coupled to an input of the vector memory 720 and to an input of each of the plane memories 730, 740, 750, 760.

As shown in FIG. 7(B) an exemplary vector-planar decompression system 715 includes the vector memory 720 and the first, second, third and fourth plane memories 730, 740, 750, 760 of FIG. 7(A), as well as first, second, third and fourth vector-planar decompressors 770, 780, 785, 790 and first, second, third and fourth laser modulators 795, 796, 797, 798. In FIG. 7(B), an output of the vector memory 720 is coupled to an input of each of the first, second, third and fourth vector-planar decompressors 770, 780, 785, 790. Additionally, an output of the first plane memory 730 is coupled to an input of the first vector-planar decompressor 770, and an output of the second plane memory 740 is coupled to an input of the second vector-planar decompressor 780. An output of the third plane memory 750 is coupled to an input of the third vector-planar decompressor 785, and an output of the fourth plane memory 760 is coupled to an input of the fourth vector-planar decompressor 790. Lastly, outputs of the first, second, third and fourth vector-planar decompressors 770, 780, 785, 790 are coupled to inputs of the first, second, third and fourth laser modulators 795, 796, 797, 798, respectively.

As with the figures described above, those skilled in the art will appreciate that the components of FIGS. 7(A) and 7(B) can be physically situated relative to one another, within an overall vector-planar color imaging system, as is appropriate for a particular application. As an example, the color page renderer 700 may be situated within a computer 110 such as that depicted in FIG. 1, while the vector-planar compressor 710, the vector memory 720, the plane memories 730, 740, 750, 760, the vector-planar decompressors 770, 780, 785, 790 and the laser modulators 795, 796, 797, 798 may be situated within a laser printer 150 such as that depicted in FIG. 1.

Those skilled in the art will also appreciate that FIGS. 7(A) and 7(B) are conceptual in nature and that functions performed by parallel components in FIG. 7(B) may actually be performed in practice by a single component. For example, the vector-planar decompressors 770, 780, 785, 790 can be implemented as a single vector-planar compressor operating to decompress individual color planes in sequential fashion as described below. The same may be said for the laser modulators 795, 796, 797, 798. Furthermore, the vector memory 720 and the plane memories 730, 740, 750, 760 may actually be partitions, or areas, within a single memory structure. The parallel components of FIG. 7(B) are included to facilitate the following description of the exemplary vector-planar imaging process.

In operation, the color page renderer 700 generates (e.g., at the request of a user of the computer system 100 of FIG. 1) uncompressed pixel data sets describing color planes (e.g., cyan, magenta, yellow and black) in an image which is to be printed. The uncompressed pixel data sets are then input to the vector-planar compressor 710 where they are compressed using a vector-planar compression technique such as that described below with respect to FIGS. 11(A) and 11(B). As the pixel data sets are compressed, vector compressed data relating to all of the color planes is stored in the vector memory 720 and planar compressed data relating only to each of the first, second, third and fourth color planes are stored in the first, second, third and fourth plane memories 730, 740, 750, 760, respectively.

Once an entire page of vector-planar compressed data is stored in the vector and planar memories, the first vector-planar decompressor 770 reconstructs the original pixel data for the first color plane, using the vector compressed data in the vector memory 720 and the planar compressed data in the first plane memory 730. Once the first color plane has been reconstructed, it is provided on demand to the first laser modulator 795 for imaging. As above, the reconstructed pixel data is converted as necessary to provide appropriate control signals for the laser modulator 795. Once the first color plane has been imaged, the second vector-planar decompressor 780 reconstructs the original pixel data for the second color plane, using the vector compressed data in the vector memory 720 and the planar compressed data in the second plane memory 740, and provides it on demand to the second laser modulator 796. After the second color plane has been imaged, the third and fourth color planes are imaged in succession in a similar fashion.

Note that at the beginning of the decompression process, the vector memory 720 and all four plane memories 730, 740, 750, 760 contain data which is necessary for imaging (i.e., each memory contains compressed pixel data for at least one particular color plane). However, once the first color plane has been imaged, the data in the first plane memory 730 is no longer needed. Accordingly, the first plane memory 730 can be released for other purposes (e.g., to accept compressed pixel data for a first color plane of a new image). Similarly, the second, third and fourth plane memories 740, 750, 760 can be released at the completion of imaging of the second, third and fourth color planes, respectively.

Figure 8A:
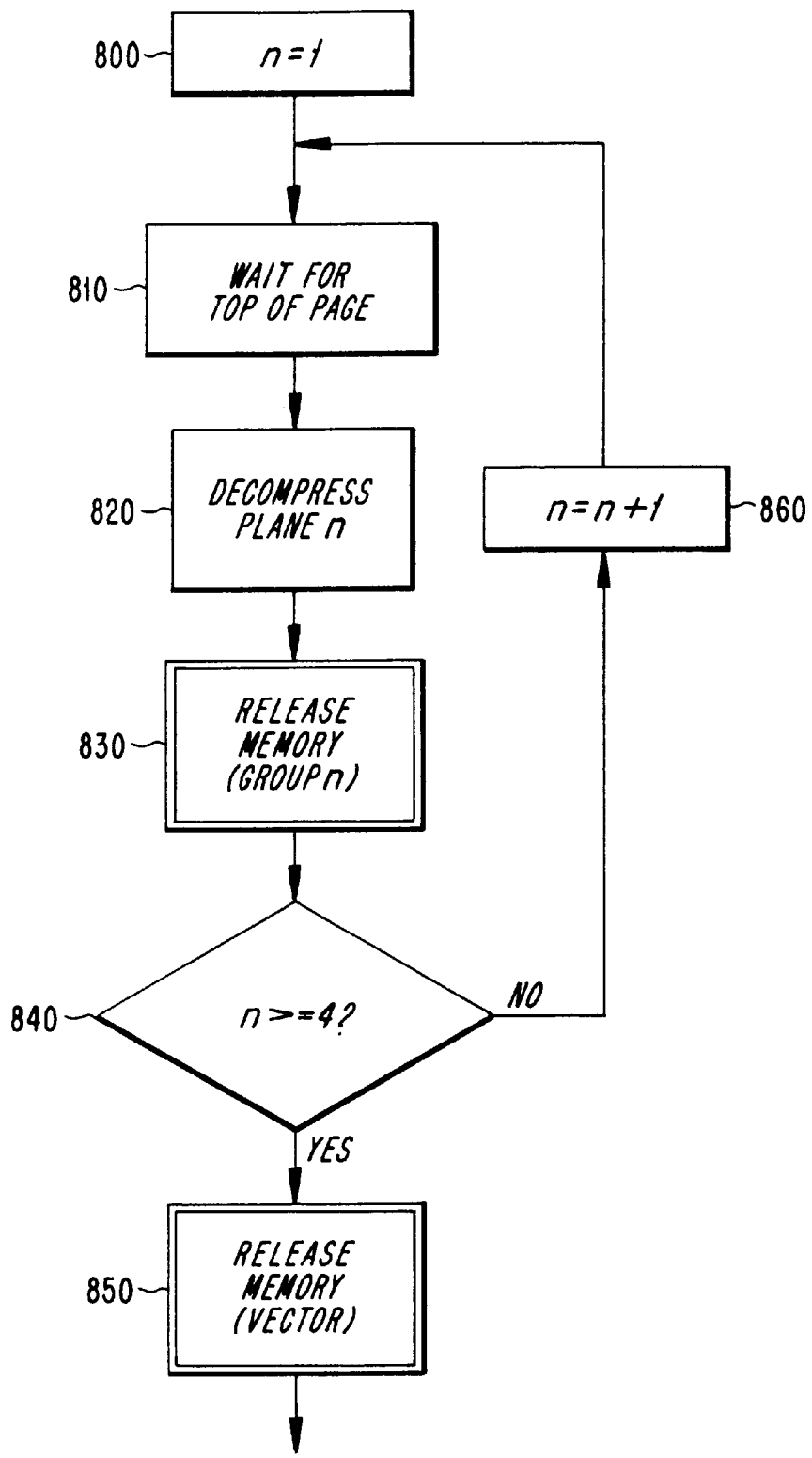
FIG. 8(A) depicts an exemplary memory management scheme corresponding to the vector-planar compression and decompression systems of FIGS. 7(A) and 7(B).

FIG. 8(A) is a flow chart depicting the process of releasing memory in a vector-planar imaging system such as that shown in FIGS. 7(A) and 7(B). As shown in FIG. 8(A), a plane counter n is set at step 800 to equal 1 at the beginning of an image (e.g., at the beginning of a new page). At step 810, processing is stopped until an indication is received that the laser modulator is ready to receive data (e.g., that the last plane of a previous page has been imaged). Once such an indication is received, data for the first color plane is decompressed at step 820, using data from the vector memory area and from the first plane memory area, and supplied on demand to the laser modulator.

Thereafter, the first plane memory is released at step 830 so that it may receive data for the next image or page, and then a determination is made at step 840 as to whether the last color plane in the current page has been imaged (i.e., n is compared to the number of color planes known to be in an image). If not, steps 810, 820 and 830 are repeated until all of the color planes are imaged and all of the plane memories are released. Once processing of the last color plane is complete, the vector memory is released and further processing continues (e.g., at step 800 to process another image).

Figure 8B:
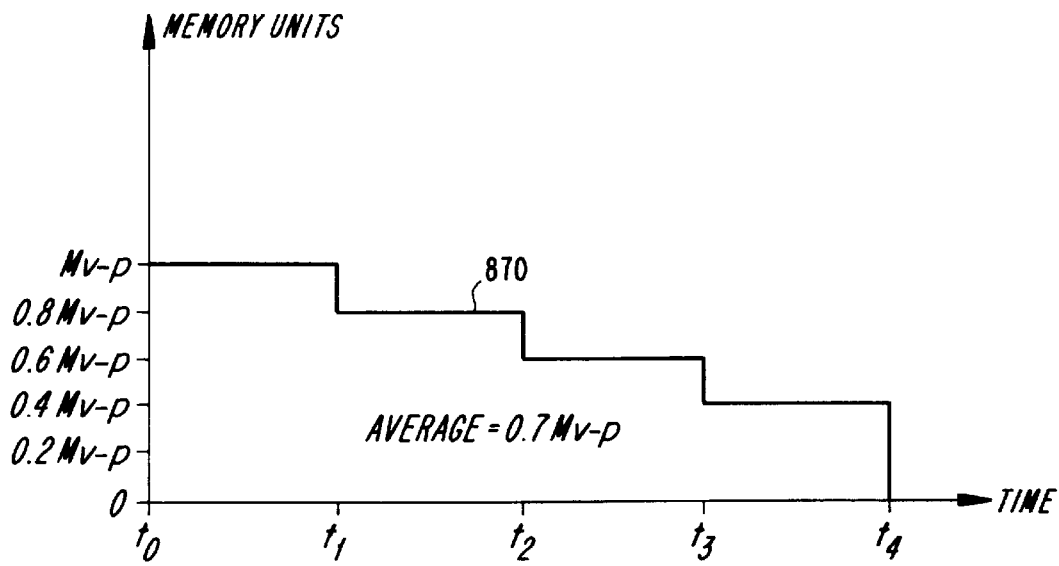
FIG. 8(B) depicts memory usage characteristics of the exemplary memory management scheme of FIG. 8(A).

FIG. 8(B) is a graphic depiction of the memory release characteristics of the memory management scheme of FIG. 8(A). As shown, at a time to (e.g., corresponding to the start of a page), memory usage is at a maximum. In other words, the vector memory 720 and all of the plane memories 730, 740, 750, 760 are occupied with compressed data needed to process the current image. In the figure, the total memory occupied by the vector memory and all four plane memories at time to is shown as a standardized memory unit having a value of $M_{V\text{-}P}$. As the image is processed and the plane memories are successively released, the amount of occupied memory decreases in step-wise fashion.

Thus, as shown in FIG. 8(B), the occupied memory drops at time $t_1$ (corresponding to the completion of imaging of the first color plane) to a value of $0.8M_{V-P}$. Thereafter, the occupied memory drops to $0.6M_{V-P}$, $0.4M_{V-P}$ and 0.0 at times $t_2$, $t_3$ and $t_4$, respectively (wherein times $t_2$, $t_3$ and $t_4$ correspond to the completion of imaging of the second, third and fourth color planes, respectively). Note that it is assumed that the same amount of memory is stored in the vector memory and each of the four plane memories, so that one fifth of the overall memory is released at the completion of each plane. The final two fifths of the overall memory are released at the completion of the last plane.

In FIG. 8(B), it can be seen that the average memory requirement for a vector-planar imaging system such as that shown in FIGS. 7(A) and 7(B) is $0.7M_{V-P}$ memory units (i.e., the average of $M_{V-P}$, $0.8M_{V-P}$, $0.6M_{V-P}$ and $0.4M_{V-P}$). Thus, the exemplary system provides a stair-stepped memory release profile analogous to that provided by the prior art planar systems. Additionally, because the vector-planar compression techniques of the present invention provide compression ratios on the order of those provided by prior art vector compression systems, the peak memory requirement and the average memory requirement for the exemplary vector-planar system are relatively low as desired.

Figure 9:
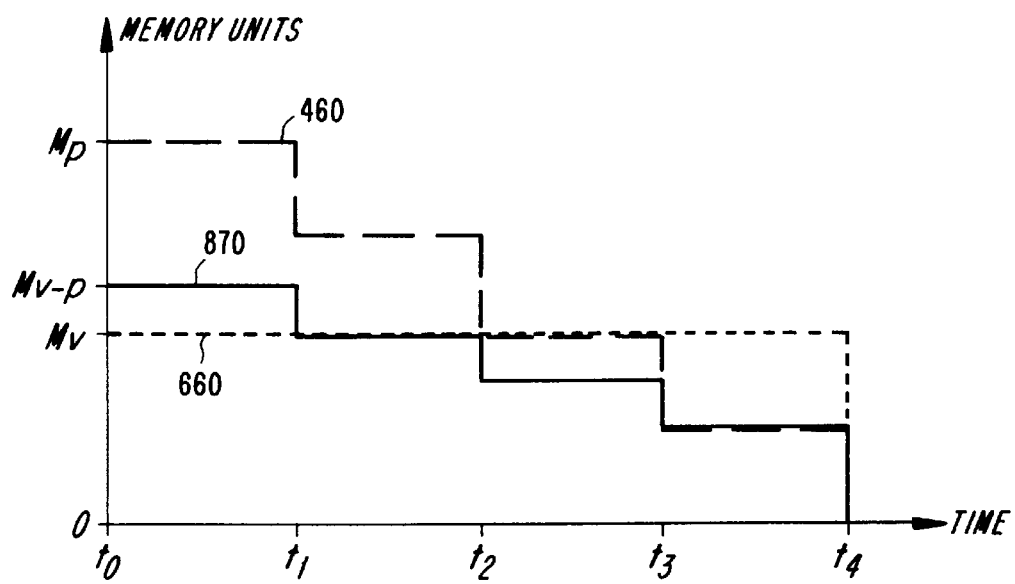
FIG. 9 depicts relative memory usage characteristics of the memory management schemes of FIGS. 4(A), 6(A) and 8(A).

FIG. 9 shows a comparison between the memory usage characteristics of the above described prior art planar systems, the above described prior art vector systems, and the above described exemplary vector-planar system taught by the present invention. As shown, the peak memory usage $M_{V-P}$ of the exemplary vector-planar system is of the same magnitude as the peak memory usage $M_V$ of the prior art vector system and typically significantly lower than the peak memory usage $M_P$ of the prior art planar system. Additionally, FIG. 9 shows that, due to the stair-step release profile of the exemplary vector-planar system, the average memory requirement of the vector-planar system is less than that of the prior art vector system, even though the peak memory requirement $M_{V-P}$ of the vector-planar system is shown in the figure to be somewhat higher than the peak memory requirement $M_V$ of the prior art vector system.

Advantageously, the present invention teaches an exemplary vector-planar compression method which can be used to derive the memory release benefits described above with respect to FIGS. 7(A), 7(B), 8(A), 8(B) and 9. In order to facilitate understanding of the exemplary vector-planar compression method, FIG. 10 depicts a prior art planar prediction-encoding method. Generally, the prior art encoding method is based on the notion that a span of identical pixels in a color plane can be compactly represented as a single pixel and an accompanying code or symbol indicating that a certain number of adjacent pixels are identical to that single pixel. Thus, the prior art planar compression method involves scanning a single plane of a color image in pixel-wise fashion and constructing a compressed data file including a reduced quantity of pixel data in combination with appropriate code words indicating how portions of the reduced data are to be repeated during decompression.

In the planar encoding scheme of FIG. 10, a plane of uncompressed pixel data is compressed by considering the data in 32-bit blocks. If a particular 32-bit block can be predicted based on (i.e., is identical to) an immediately preceding 32-bit block, then a code word indicating that fact is written to the compression memory and the 32-bit data block itself is not written. If the 32-bit block cannot be predicted, then a determination is made whether the first 8 bits in the block can be predicted based on an immediately preceding 8 bits. If so, then a code word indicating that fact is written to the compression memory and the 8-bit data itself is not written. Only when neither a 32-bit block nor an 8-bit block can be predicted is an actual 8-bit byte of pixel data (and an accompanying overhead code indicating that it is actual data) written to the compression file. The process is repeated until the entire uncompressed plane of pixel data is compressed into a string of "32-bit repeat" symbols and "8-bit repeat" symbols intermixed with 8-bit data bytes and accompanying "data" symbols.

As shown in FIG. 10, processing is initiated at step 1010 and at step 1020 a determination is made whether the next 32-bit block in the uncompressed plane can be predicted based on the immediately preceding 32-bit block (of course, for the first 32-bit block there is no "preceding" block to consider). If 32-bit prediction is possible, then a "32-bit" code is written to the planar compression memory at step 1040. If 32-bit prediction is not possible, then a determination is made at step 1030 whether the next 8-bit block in the uncompressed plane (i.e., the first byte in the 32-bit block considered at step 1020) can be predicted based on the immediately preceding 8 bits. If so, then an "8-bit" code is written to the planar compression memory at step 1050. If not, then a "data" code and the actual 8-bit block of data are written to the planar compression memory at step 1060. Once either the "32-bit" symbol, the "8-bit" symbol or the "data" symbol and 8-bit data have been written to the planar compression memory, a determination is made at step 1070 whether the last byte of data in the uncompressed plane has been processed. If so, then processing is terminated at step 1080. If not, processing continues at step 1020 and the next as yet uncompressed 32-bit block is considered.

Figure 11A:
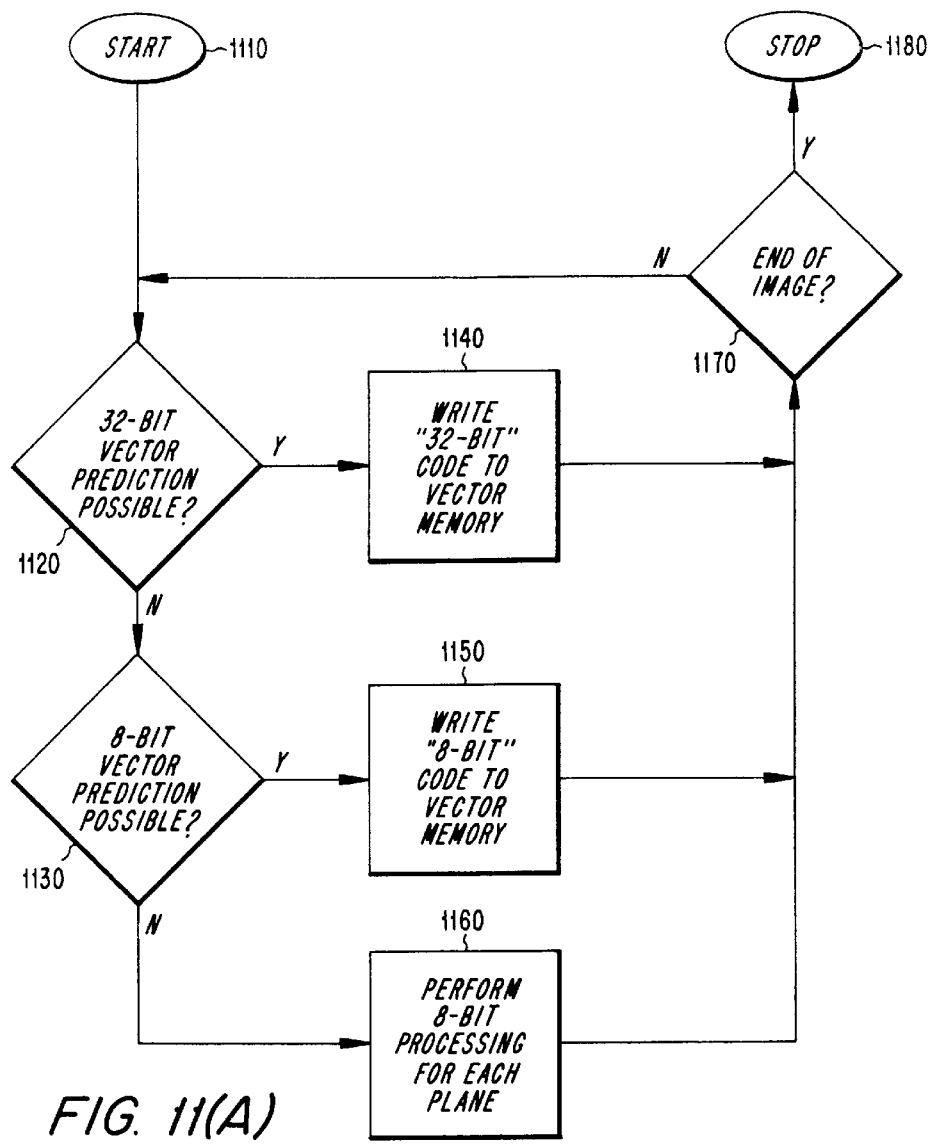
FIGS. 11(A) and 11(B) depict steps in an exemplary vector-planar prediction-encoding algorithm taught by the present invention.
Figure 11B:
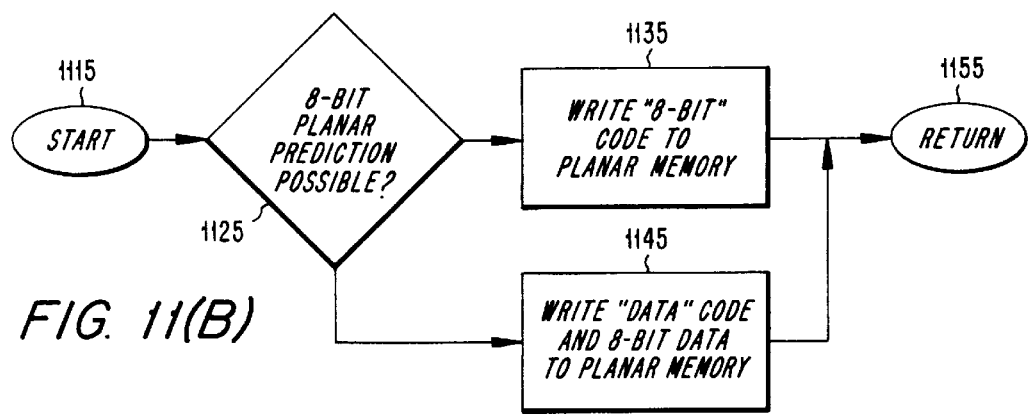

The process of FIG. 10 can be repeated for each plane in a color image to produce a plurality of compressed color planes which can then be decompressed and released in step-wise fashion during printing as described above. However, the compression ratios attainable using the method of FIG. 10 are typically not as low as those provided by known vector techniques. Advantageously, the present invention teaches a vector-planar method of compression, depicted in FIGS. 11(A) and 11(B), which provides compression ratios on the order of those provided by known vector methods and which allows for the step-wise memory release profiles typically associated with known planar methods. The exemplary method of FIGS. 11(A) and 11(B) is analogous to that of FIG. 10. Significantly, however, the present invention teaches that prediction encoding can often be carried out more effectively at the vector level (i.e., considering all planes in a color image simultaneously) and that prediction encoding at the planar level is often better used as an effective supplement to vector-level prediction encoding.

In FIG. 11(A), processing is initiated at step 1110 and at step 1120 a determination is made whether the next 32-bit block in each plane of an uncompressed color image can be predicted based on the immediately preceding 32-bit blocks in the respective planes. If 32-bit vector prediction is possible, then a "32-bit vector repeat" code is written to a vector compression memory at step 1140. If 32-bit vector prediction is not possible, then a determination is made at step 1130 whether the next 8-bit block in each plane of the uncompressed color image can be predicted based on the immediately preceding 8 bits in each plane. If so, then an "8-bit vector repeat" code is written to the vector compression memory at step 1150. If not, then 8-bit processing, as described below with respect to FIG. 11(B), is performed for each plane at step 1160. Once either the "32-bit" vector symbol or the "8-bit" vector symbol has been written, or once 8-bit processing has been performed for each plane, a determination is made at step 1170 whether the last byte of data in each plane of the uncompressed color image has been processed. If so, then processing is terminated at step 1180. If not, processing continues at step 1120 and the next as yet uncompressed 32-bit vector block in the color image is considered.

FIG. 11(B) depicts the 8-bit process that is carried out for each color plane at step 1160 of FIG. 11(A). As shown, 8-bit planar processing starts at step 1115, and a determination is made at step 1125 whether the next 8 bits in a particular plane can be predicted based on the immediately preceding 8 bits in that plane. If so, then an "8-bit planar repeat" code is written at step 1135 to a planar compression memory corresponding to the given plane. If not, then a "planar data" code and the actual 8-bit block of planar data are written to the corresponding planar compression memory at step 1145. Once the preceding steps 1125, 1135, 1145 have been carried out for each plane in the color image, vector processing is resumed at step 1155.

In this way a color image is compressed into a vector compression memory, comprising 32-bit and 8-bit repeat symbols, and a plurality of planar compression memories comprising 8-bit repeat symbols intermixed with data symbols and 8-bit planar data. Advantageously, the compression ratios provided by the exemplary method of FIGS. 11(A) and 11(B) are similar to those provided by known vector compression techniques. Additionally, the planar compression memories can be released as each respective plane in a color image is decompressed and printed. Thus, the exemplary method of FIGS. 11(A) and 11(B) simultaneously provides superior peak and average memory profiles as desired.

Those skilled in the art will appreciate that the present invention is not limited to the specific exemplary embodiments which have been described herein for purposes of illustration. For example, although the exemplary embodiments have been described with reference to a single vector storage unit and four planar storage units, the method disclosed herein is equally applicable to data sets having any number of components greater than one. Additionally, one could also use more than one vector memory storage area to derive still better memory release characteristics. For example, data that is used to reconstruct only the cyan and magenta planes can be placed in a vector memory area that is used only in reconstructing the cyan and magenta planes, and not the yellow or black planes. Such a cyan-magenta vector memory can then be released once the cyan and magenta planes are imaged.

Furthermore, even though the exemplary embodiments described above are directed to color planes in a laser printer system, the disclosed methods are equally useful for the compressing other types of data sets. For example, consider the case where every eight motion picture frames are grouped together as a bundle. The temporal nature of motion picture frames allows one to compress a group of eight frames more efficiently than one can compress the same eight frames individually. However, as in the prior art vector imaging system described above, compressing eight frames as a group requires that one retain the compressed data for the duration of the decompression process. According to the present invention, however, if the data is compressed into nine storage areas, one storage area being common to the entire group of eight frames and the remaining eight storage areas each being exclusive to an individual frame, then more memory is freed on average as compared to a system in which all eight frames are compressed into a single unit of memory.

The scope of the invention, therefore, is defined by the claims which are appended hereto, rather than the foregoing description, and all equivalents which are consistent with the meaning of the claims are intended to be embraced therein.

What is claimed is:

1. A data compression method, comprising the steps of:
   receiving a plurality of uncompressed data sets as input;
   selecting a portion of each uncompressed data set;
   vector compressing the selected portions collectively, using a vector compression technique, to form vector compressed data when the data in the selected portions is related for each data set;
   planar compressing the selected portions independently if the selected portions cannot be compressed collectively, using a planar compression technique, to form planar compressed data for each of the selected portions;
   storing vector compressed data, resulting from said step of vector compressing, in a vector data memory storage area; and
   storing planar compressed data, resulting from said step of planar compressing, in a plurality of planar data memory storage areas such that each one of the planar storage areas stores planar compressed data corresponding to one of the uncompressed data sets.

2. The method of claim 1, wherein said steps of selecting, compressing and storing are repeated until all data in the uncompressed data sets are compressed.

3. The method of claim 1, wherein said vector compression technique is a vector prediction encoding technique and wherein said planar compression technique is a planar prediction encoding technique.

4. The method of claim 1, wherein each of said uncompressed data sets corresponds to a plane in a color image and wherein said method comprises the additional step of transmitting the vector compressed data and the planar compressed data to an imaging device.

5. The method of claim 4, wherein said imaging device is a color laser printer.

6. A data compression method, comprising the steps of:
   receiving a plurality of uncompressed data sets as input; and
   alternately applying vector and planar compression techniques to portions of said uncompressed data sets to form (a) a vector compressed data set including compressed data relating to all of the uncompressed data sets and (b) a plurality of planar compressed data sets, each planar compressed data set including compressed data relating to a particular one of the uncompressed data sets.

7. The method of claim 6, comprising the additional steps of:
   storing the vector compressed data set in a vector memory storage area and storing each of the planar compressed data sets in a separate planar memory storage area.

8. The method of claim 6, wherein said vector and planar compression techniques are vector prediction encoding and planar prediction encoding techniques, respectively.

9. The method of claim 6, wherein each of said uncompressed data sets corresponds to a plane in a color image and wherein said method comprises the additional step of transmitting the vector compressed data and the planar compressed data to an imaging device.

10. The method of claim 9, wherein said imaging device is a color laser printer.

11. A data compression method, comprising the steps of:
receiving a plurality of original data sets as input;
selecting a portion of each of said original data sets;
vector compressing the received portions collectively using vector compression when the data in the selected portions is related for each data set;
planar compressing at least a sub-portion of each of the selected portions independently using planar compression if said sub-portion cannot be collectively compressed; and
repeating said steps of selecting and compressing to compress all data in the original data sets.

12. The method of claim 11, wherein said vector compression comprises vector prediction encoding and wherein said planar compression comprises planar prediction encoding.

13. The method of claim 11, comprising the additional steps of:
storing vector compressed data, resulting from said step of vector compressing, in a vector memory storage area; and
storing planar compressed data, resulting from said step of planar compressing, in a plurality of planar memory storage areas such that each of the planar storage areas includes planar data for a particular one of the original data sets.

14. The method of claim 13, wherein each of said original data sets corresponds to a plane in a color image and wherein said method comprises the additional step of transmitting the vector compressed data and the planar compressed data to an imaging device.

15. The method of claim 14, wherein said imaging device is a color laser printer.

16. A data decompression method, comprising the steps of:
receiving a vector data set and a plurality of planar data sets as input, wherein said vector data set includes compressed data relating to a plurality of original data sets, and wherein each one of said planar data sets includes compressed data relating to one of said original data sets;
reconstructing a particular one of the original data sets using said vector data set in conjunction with the planar data set which includes compressed data relating to the particular one of the original data sets; and
repeating said step of reconstructing for each one of the original data sets.

17. The method of claim 16, wherein said step of receiving comprises the steps of retrieving said vector data set from a vector memory storage area and retrieving each one of said planar data sets from a separate planar memory storage area.

18. The method of claim 17, comprising the additional steps of:
releasing a particular planar memory storage area once an original data set has been reconstructed using data stored in the particular planar memory storage area; and
releasing the vector planar memory storage area once all of the original data sets have been reconstructed.

19. The method of claim 16, wherein each of said original data sets corresponds to a plane in a color image and wherein said method comprises the additional step of transmitting the reconstructed original data sets to an imaging device.

20. The method of claim 19, wherein said imaging device is a laser modulator in a color laser printer.

21. A data compression device, comprising:
means for receiving a plurality of uncompressed data sets as input;
means for selecting a portion of each uncompressed data set;
means for vector compressing the selected portions collectively, using a vector compression technique, to form vector compressed data;
means for planar compressing, if the selected portions cannot be collectively compressed, the selected portions independently, using a planar compression technique, to form planar compressed data for each of the selected portions;
a vector data memory storage area storing vector compressed data generated by said means for vector compressing; and
a plurality of planar data memory storage areas storing planar compressed data generated by said means for planar compressing, wherein each one of said planar storage areas stores planar compressed data corresponding to one of said uncompressed data sets.

22. A data decompression device, comprising:
means for receiving a vector data set and a plurality of planar data sets as input, wherein said vector data set includes compressed data relating to a plurality of original data sets, and wherein each one of said planar data sets includes compressed data relating to one of said original data sets;
means for reconstructing a particular one of the original data sets using said vector data set in conjunction with the planar data set which includes compressed data relating to the particular one of the original data sets; and
means for repeating said step of reconstructing for each one of the original data sets.

23. A method for compressing a color image, wherein said color image is defined by a plurality of color planes, comprising the steps of:
receiving as input an uncompressed data set for each of said plurality of color planes;
selecting a portion of data from each uncompressed data set;
vector compressing the selected portions collectively, using vector compression, to form vector compressed data;
planar compressing, if said step of vector compressing is unsuccessful, the selected portions independently, using planar compression, to form planar compressed data for each of the selected portions;
storing vector compressed data in a vector data memory storage area, said vector compressed data resulting from said step of vector compressing and relating to every one of the color planes; and
storing planar compressed data, resulting from said step of planar compressing, in a plurality of planar data memory storage areas such that each one of the planar storage areas stores planar compressed data relating to a particular one of the color planes.

24. The method of claim 23, wherein said steps of selecting, compressing and storing are repeated until all data in the uncompressed data sets are compressed.

25. The method of claim 23, wherein said vector compression is vector prediction encoding and wherein said planar compression is planar prediction encoding.

26. The method of claim 23, wherein said method comprises the additional step of transmitting the vector compressed data and the planar compressed data to an imaging device.

27. The method of claim 26, wherein said imaging device is a color laser printer.

28. The method of claim 23, comprising the additional step of rendering data objects to generate pixel data which defines the color planes.

29. A device for compressing a color image, wherein said color image is defined by a plurality of color planes, comprising:

means for receiving as input an uncompressed data set for each of said plurality of color planes;

means for selecting a portion of data from each uncompressed data set;

means for vector compressing the selected portions collectively, using vector compression, to form vector compressed data;

means for planar compressing the selected portions independently, if they cannot be compressed collectively, to form planar compressed data for each of the selected portions;

a vector data memory storage area storing vector compressed data generated by said means for vector compressing and relating to every one of the color planes; and a plurality of planar data memory storage areas storing planar compressed data resulting from said step of compressing, wherein each one of the planar storage areas stores planar compressed data relating to a particular one of the color planes.

30. The device of claim 29, wherein successive portions of the uncompressed data sets are selected, compressed and stored until all data in the uncompressed data sets are compressed.

31. The device of claim 29, wherein said vector compression is vector prediction encoding and wherein said planar compression is planar prediction encoding.

32. The device of claim 29, further comprising means for transmitting the vector compressed data and the planar compressed data to an imaging device.

33. The device of claim 32, wherein said imaging device is a color laser printer.

34. The device of claim 29, further comprising means for rendering data objects to generate pixel data which defines the color planes.

35. The device of claim 34, wherein said device is a general purpose computer.

36. A method for decompressing a color image, comprising the steps of:

receiving a vector data set and a plurality of planar data sets as input, wherein said vector data set includes compressed data relating to a plurality of color planes which define the color image, and wherein each one of said planar data sets includes compressed data relating to one of said color planes;

reconstructing a particular one of the color planes using said vector data set in conjunction with the planar data set which includes compressed data relating to the particular one of the color planes; and repeating said step of reconstructing for each one of the color planes.

37. The method of claim 36, wherein said step of receiving comprises the steps of retrieving said vector data set from a vector memory storage area and retrieving each one of said planar data sets from a separate planar memory storage area.

38. The method of claim 37, comprising the additional steps of:

releasing a particular planar memory storage area once a color plane has been reconstructed using data stored in the particular planar memory storage area; and releasing the vector planar memory storage area once all of the planes have been reconstructed.

39. The method of claim 36, comprising the additional step of transmitting the reconstructed color planes to an imaging device.

40. The method of claim 39, wherein said imaging device is a laser modulator in a color laser printer.

41. A device for decompressing a color image, comprising:

means for receiving a vector data set and a plurality of planar data sets as input, wherein said vector data set includes compressed data relating to a plurality of color planes which define the color image, and wherein each one of said planar data sets includes compressed data relating to one of said color planes;

means for reconstructing a particular one of the color planes using said vector data set in conjunction with the planar data set which includes compressed data relating to the particular one of the color planes; and means for repeating said step of reconstructing for each one of the color planes.

42. The device of claim 41, further comprising:

a vector memory storage area storing said vector data set; and a plurality of planar memory storage areas, each storing one of said planar data sets.

43. The device of claim 42, further comprising:

means for releasing a particular planar memory storage area once a color plane has been reconstructed using data stored in the particular planar memory storage area; and means for releasing the vector planar memory storage area once all of the planes have been reconstructed.

44. The device of claim 41, further comprising means for transmitting the reconstructed color planes to an imaging device.

45. The device of claim 44, wherein said device is a color laser printer and wherein said imaging device is a laser modulator.

46. A method for processing a color image, comprising the steps of:

rendering data objects to generate a pixel data set for each of a plurality of color planes which define the color image;

selecting a portion of data from each pixel data set;

vector compressing the selected portions collectively, using vector compression, to form vector compressed data;

planar compressing, if the selected portions cannot be compressed collectively, the selected portions independently, using planar compression, to form planar compressed data for each of the selected portions;

storing vector compressed data in a vector data memory storage area, said vector compressed data resulting from said step of vector compressing and relating to every one of the color planes;

storing planar compressed data, resulting from said step of planar compressing, in a plurality of planar data memory storage areas such that each one of the planar storage areas stores planar compressed data relating to a particular one of the color planes;

repeating said steps of selecting, compressing and storing until all data in the pixel data sets are compressed and stored in the vector and planar memory storage areas;

reconstructing a particular one of the color planes using the vector compressed data stored in the vector memory storage area in conjunction with the planar compressed data stored in the particular planar memory storage area relating to the particular one of the color planes;

transmitting the reconstructed color plane to an imaging device;

releasing the particular planar memory storage area;

repeating said steps of reconstructing, transmitting and releasing for each one of the color planes; and releasing the vector planar memory storage area.

47. A data compression method, comprising the steps of:

receiving a plurality of uncompressed data sets as input;

selecting a portion of each uncompressed data set;

compressing the selected portions to form compressed data;

storing a first portion of the compressed data in a vector memory storage area, wherein said first portion of the compressed data relates to a plurality of the uncompressed data sets; and storing additional portions of the compressed data in a plurality of planar memory storage areas, wherein each of said additional portions of the compressed data relates exclusively to a particular one of the uncompressed data sets.

48. The method of claim 47, wherein said steps of selecting, compressing and storing are repeated until all data in the uncompressed data sets are compressed.

49. The method of claim 47, wherein said step of compressing comprises the steps of:

vector compressing the selected portions collectively, using a vector compression technique, to form vector compressed data when the data in the selected portions is related for each data set; and planar compressing the selected portions independently if the selected portions cannot be compressed collectively, using a planar compression technique, to form planar compressed data for each of the selected portions.

50. The method of claim 49, wherein said vector compression technique is a vector prediction encoding technique and wherein said planar compression technique is a planar prediction encoding technique.

51. The method of claim 47, wherein each of said uncompressed data sets corresponds to a plane in a color image and wherein said method comprises the additional step of transmitting the compressed data to an imaging device.

52. The method of claim 51, wherein said imaging device is a color laser printer.

* * * * *